United States Patent [19]
> Schaefer, Jr. et al.

[11] 3,742,879
[45] July 3, 1973

[54] AUTOMATIC WORK GUIDANCE MECHANISM

[75] Inventors: Hans F. Schaefer, Jr., Rockport; Reade Williams, Hamilton, both of Mass.

[73] Assignee: USM Corporation, Flemington, N.J.

[22] Filed: Dec. 3, 1970

[21] Appl. No.: 94,772

[52] U.S. Cl............. 112/121.12, 318/571, 318/696
[51] Int. Cl.......................................... D05b 21/00
[58] Field of Search................. 112/121.11, 121.12, 112/121.15, 102, 204, 2; 318/561, 569, 571, 574, 603, 672, 685, 696; 310/49; 318/573

[56] References Cited
UNITED STATES PATENTS

| | | | |
|---|---|---|---|
| 3,015,806 | 1/1962 | Wang et al............................ | 318/571 |
| 3,448,705 | 1/1969 | Scherr et al.................... | 112/121.12 |
| 3,474,747 | 10/1969 | Noiles............................ | 112/121.12 |
| 3,579,279 | 5/1971 | Inaba................................ | 318/696 |
| 3,585,478 | 6/1971 | Leenhouts .......................... | 318/573 |
| 3,653,347 | 4/1972 | Bianchi......................... | 112/121.12 |
| 3,656,377 | 4/1972 | Kosem ........................... | 318/571 X |
| 3,385,244 | 5/1968 | Ramsey et al .................. | 112/102 X |
| 3,528,378 | 9/1970 | Westoff........................ | 112/121.15 |
| 3,405,670 | 10/1968 | Scholl et al..................... | 112/102 X |
| 3,399,640 | 9/1968 | Bryan et al. .................. | 112/121.15 |

Primary Examiner—*James R. Boler*
Attorney—*Richard A. Wise, Richard B. Megley and Carl E. Johnson*

[57] ABSTRACT

An apparatus for automatically guiding sheet material substantially in its own plane and relative to an operating zone by numerical control. The work, for instance a flexible fabric to be stitched in a sewing machine along a predetermined path, is moved in precise directional increments the X and Y components of which are imparted between tool strokes or needle insertions by coacting motive means in a non-rectilinear coordinate system. Low inertia is attained by a movable work supporting or clamping structure wherein a pivotal Y-arm carries a motor for moving an X-arm about its pivot, and the pivotal X-arm carries a motor for moving the work clamp and work radially relative to the X-arm pivot. A pulse generator coupled to the machine embodying the invention, illustratively a sewing machine devoid of conventional work feeding means such as a dog, provides multiple pulsing per revolution of a main crankshaft, and a pulse counting means signals each motor to yield an intermittent feed each controlled step of which is accelerated-decelerated between selective, variable dwells.

2 Claims, 14 Drawing Figures

Inventors
Hans F. Schaefer, Jr
Reade Williams
By their Attorney

Carl E. Johnson.

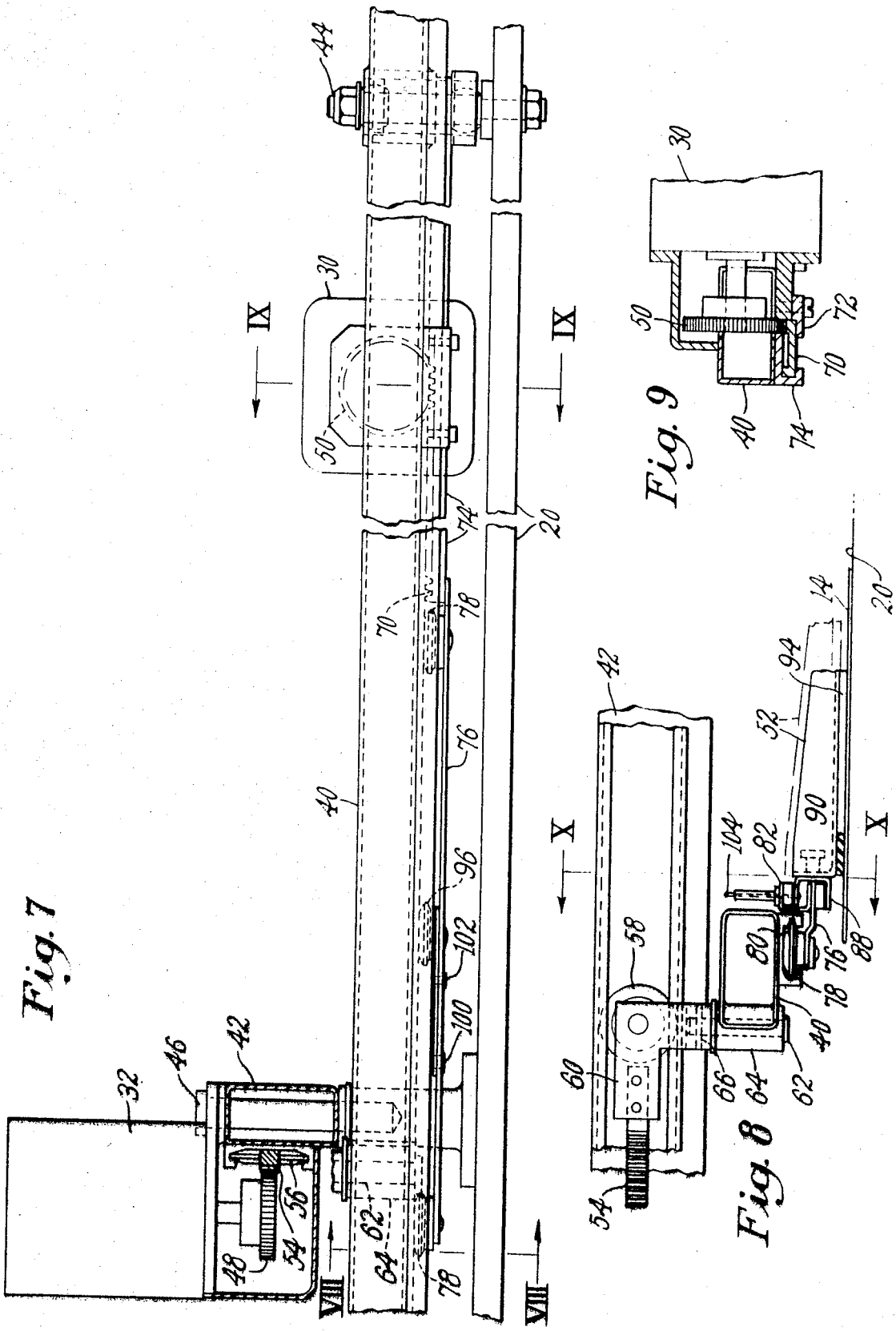

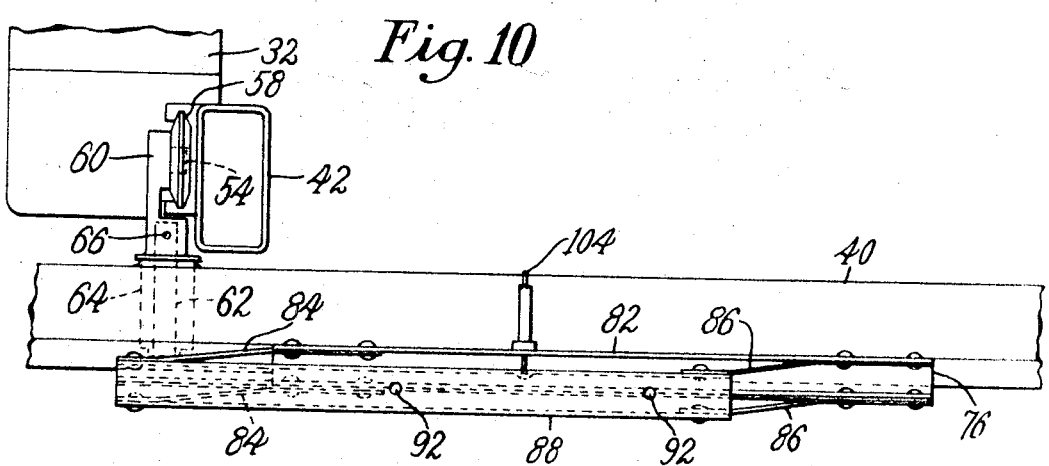
Fig. 10
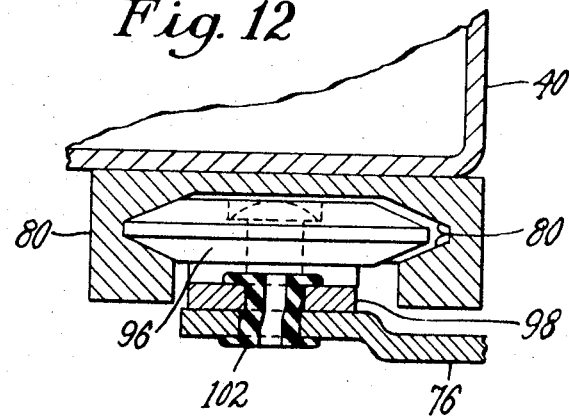
Fig. 11
Fig. 12
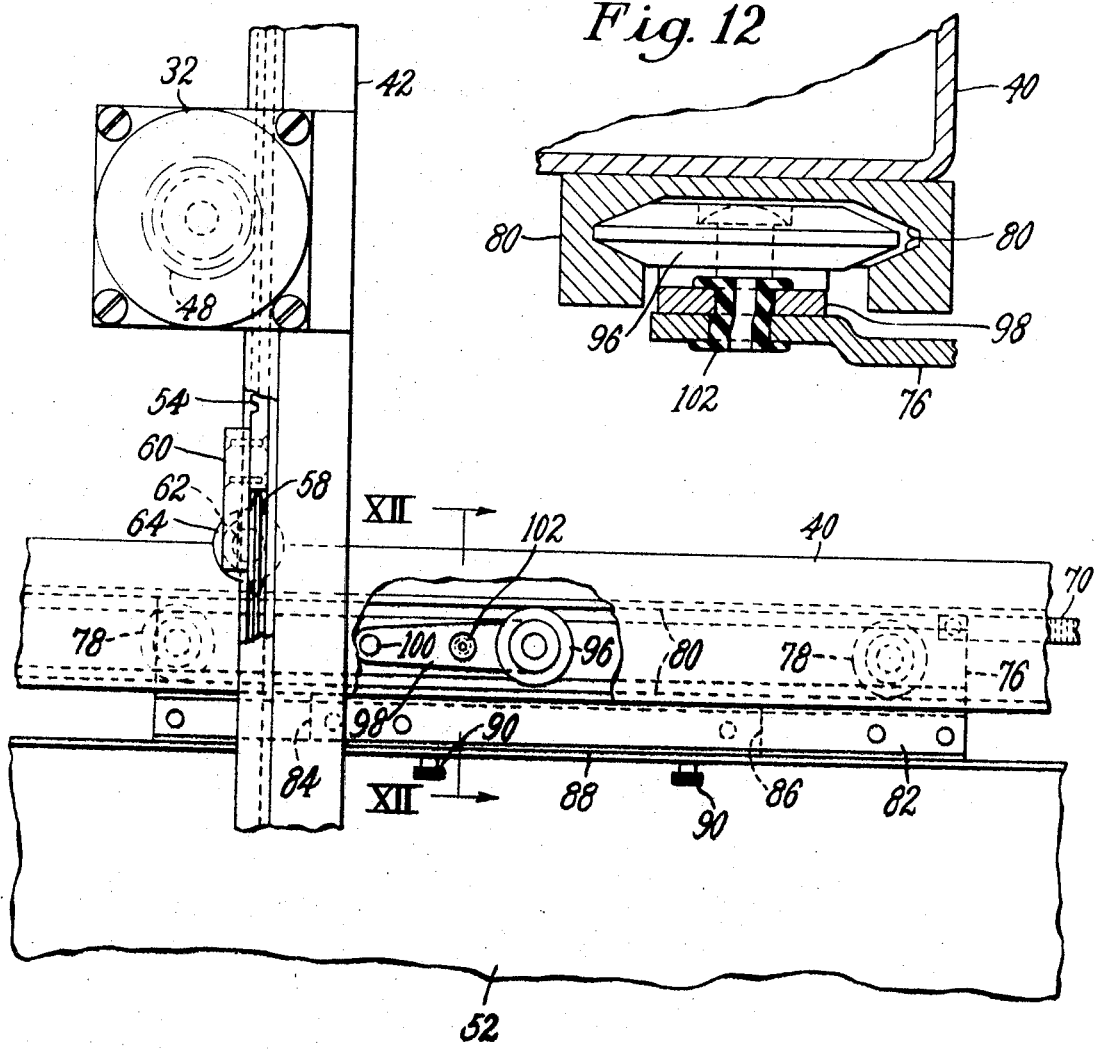

AUTOMATIC WORK GUIDANCE MECHANISM

BACKGROUND OF THE INVENTION

This invention pertains to automatic mechanism for positioning sheet material, especially flexible sheets of fabric or the like, to be guided in programmed manner to and through the operating zone of a machine. The invention is particularly well adapted for use with a sewing machine which may be required to provide seams that are curved as well as straight, but it will be understood that the invention is not limited for use with a sewing machine, and that it also has application in non-intermittently operative machines of many types and wherein a wide variety of sheet material including leather, paper, and plastics as well as fabric and non-woven items are to be continuously guided in predetermined manner.

Prior attempts have been made to provide automatic means for relatively moving a work piece and a tool for precisely operating thereon according to numerical control. Problems arise particularly when the work piece to be processed is flexible or limp; edge guidance, for example, becomes inaccurate when a work margin is distorted or deflected. Also, since work pieces of fabric or the like may be of low mass and even flimsy while having quite irregular contour and curvature, it becomes essential for accurate results to employ guidance mechanism of low inertia and high response characteristics. Various earlier approaches employ a cam shape for relatively guiding the work and tool thus necessitating a plurality of interchangeable, massive, and costly cams if the machine is to do other than repeat operations. Another approach seeks, in an edge guided automatic sewing machine having a unidirectional feed dog, to employ sensing means for properly rotating a work clamp about a needle axis, the clamp also being powered for movement along rectangular coordinates rotatable with the clamped work. Also, photosensing means has been employed for controlling relative motion of a machine head and cloth work.

So far as known no prior automatic work positioning mechanism has proved commercially acceptable for programmed operations on flexible sheet material, presumably due to economic factors or inherently unsatisfactory performance such as may be attributed to excess inertia.

SUMMARY OF THE INVENTION

In view of the foregoing it is an object of this invention to provide an improved, relatively economical apparatus for relatively positioning flexible sheet material and a tool by numerical control, the path of operation being precisely determined.

More specifically it is an object of this invention to provide a data controlled work positioning mechanism for obtaining high productivity and embodying a non-rectangular coordinate work moving means whereby a flexible sheet may be precisely moved in its own plane relative to an operating tool, for instance a sewing machine needle.

A further object is to provide, especially for use with stitch forming means, an automatic system for predeterminedly shifting according to control data a work piece directionally in its own plane between successive work engagements of the stitch forming means, the work motion to occur at variable rates between exactly known stitch receiving points having substantially constant spacing.

In accordance with these objects and as herein shown, an automatic work positioning apparatus eliminates the need for stitching skill by featuring a low inertia work moving mechanism, in this case a clamp for universally sliding the work in its own plane, the clamp and work moving together between stitches solely as directed by control information, for instance from a perforated tape. Increments of feed to provide a constant stitch length and precise stitch placements are synchronized with needle engagements with the work by means of a pulse generating synchronizer adapted to provide, in the constant speed stitcher 1,000 pulses per revolution of its crankshaft, i.e., 1,000 pulses per stitch. The intermittent work clamp motion is the resultant of compensated X and Y coordinate components imparted by their respective stepping motors, the latter being controlled from the same tape. For each selected group of generated timing pulses counted, a pulse is sent to a stepping motor, then after a next selected group of counted synchronizer pulses as specified in a table, another pulse is sent to the motor, etc. The control logic includes several such tables of different lengths calling for different numbers of stepping pulses to be sent to the motors, the tape or software indicating which table to use for each motor and picking-off desired stepping pulses for each stitch.

In the illustrative machine for peripheral operations on fabric the work clamp may be of selected contour for engaging the fabric within about one-fourth inch from a stitch line which may extend in any direction. The arrangement is desirably such that the control data determines one or more of the following factors: starting and stopping of stitching (which may extend only a portion of a periphery); raising or lowering work clamp relative to the work; motion of clamp and work to present and retract the work relative to an operating zone. While the apparatus exemplified is described as comprised of electronic controls it will be appreciated that in various aspects mechanical and/or fluidic elements may be effectively interchanged at least in part when desired.

BRIEF DESCRIPTION OF THE DRAWINGS

The above and other features of the invention together with novel details and combinations of parts will now be more particularly described in connection with an illustrative embodiment, and with reference to the accompanying drawings thereof, in which:

FIG. 7 is a view in front elevation and partly in section, on a larger scale, of the apparatus shown in FIG. 5, the sewing machine being omitted and the relation of the work positioning motors to their coordinate arms being indicated;

FIG. 8 is a section taken on the line VIII—VIII of FIG. 7 and showing the pivotal relation of the coordinate arms and a portion of the work clamp mounting;

FIG. 9 is a section taken on the line IX—IX of FIG. 7 showing a motor connecting means with a clamp moving rack;

FIG. 10 is a section taken on the line X—X of FIG. 8 showing the work clamp and its mounting;

FIG. 11 is a plan view of the work clamp and a take-up means therefor;

FIG. 12 is a sectional detail taken on the line XII—XII of FIG. 11; and

DESCRIPTION OF THE PREFERRED EMBODIMENT

Figure 1:
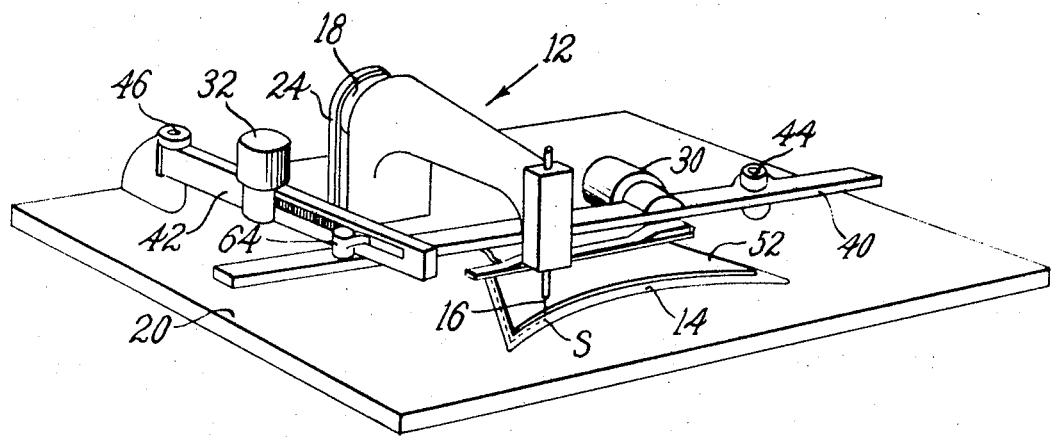
FIG. 1 is a perspective and somewhat schematic view of automatic work guidance apparatus as applied to a sewing machine.
Figure 5:
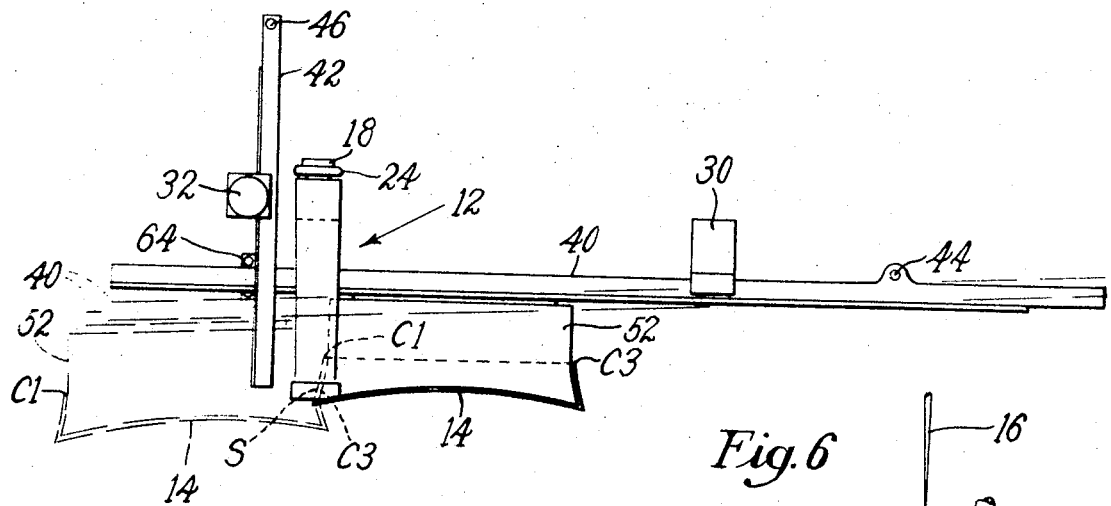
FIG. 5 is a plan view of the apparatus shown in FIG. 1 having its work clamp mechanism loaded and guided for operating, for example, on a man's shirt collar.
Figure 6:
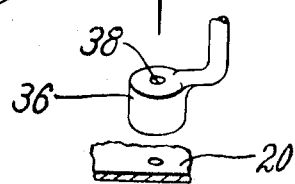
FIG. 6 is a detail view of a presser foot as adapted to aid work guidance in any direction.

The invention will be described as applied to a stationary sewing machine generally designated 12 (FIGS. 1, 2, 5) adapted to operate on fabric 14, it being understood that the invention is not limited to sewing operations, nor to guidance of any particular sheet material. The apparatus embodying the invention could alternatively be adapted for guidance movement of the machine relative to a stationary work piece though such is not ordinarily preferred in view of the probably unfavorable inertia factor then encountered.

The machine 12 has stitch forming instrumentalities including at least one vertically reciprocable needle 16 driven by the usual main crankshaft (not shown) from a pulley-handwheel 18 by a power means (not shown). It may be assumed for present purposes that the crankshaft speed is constant.

The machine is secured on a work carrying table 20, and is not provided with linear feeding means of conventional type, such as an orbital feed dog, but is adapted to operate in any direction on sheet material such as the fabric collar 14 to be automatically guided substantially in its own plane by numerically controlled mechanism which is hereinafter to be described.

Before describing details of the work guidance structure as depicted in FIGS. 5–12, its mode of operation will be briefly explained with reference to FIGS. 1–4, it being assumed for simplicity that a rectilinear coordinate arrangement is employed, which is not strictly the case. The work 14 is moved automatically by power means a constant stitch length Z between successive work penetrating strokes of the needle 16, the variable X and Y components of each stitch being predetermined. For this purpose a pulse generating synchronizer 22 (FIG. 2) coupled to the crankshaft as by a timing belt 24 running on the pulley 18 is adapted to provide in each revolution of the shaft 1,000 pulses. This is to say that for each stitch length Z the generating synchronizer 22 delivers 1,000 uniform pulses or 33,000 pulses per second at 2,000 r.p.m. of the stitcher. A digital computer 26 shown diagrammatically only in FIG. 2 and programmed by softwear wear 28, for instance a perforated tape (not shown), modulates the pulse frequency delivered from the synchronizer 22 to control work acceleration and deceleration between successive needle engagements or dwell intervals to be dictated by stepping pulsing to a reversible X-motor 30 (FIGS. 1, 2, 5 and 7) controlling change in radius and a reversible Y-motor 32 (FIGS. 1, 2, 5 and 6. controlling change in angle.)

Figure 2:
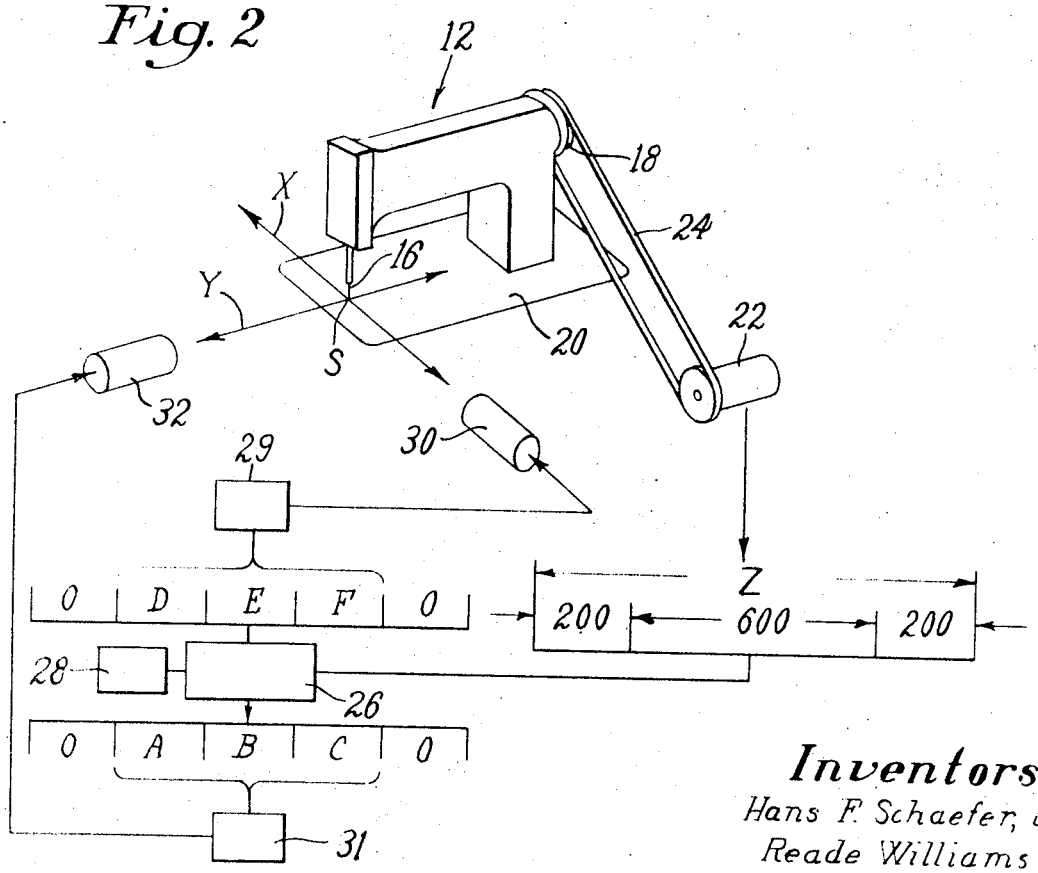
FIG. 2 is a schematic diagram of the guidance control system indicating its stepping motors shown in FIG. 1 and their control means.
Figure 3:
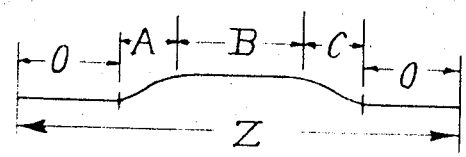
FIG. 3 illustrates a magnified stitch length and indicates a typical distribution of zero work velocity as well as full velocity, acceleration and deceleration during the stitch making.
Figure 4:
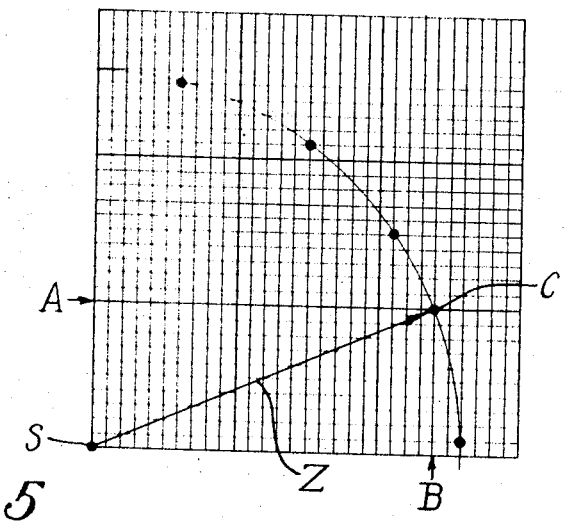
FIG. 4 is a diagram indicating theoretical derivation of a stitch length.

Referring further to FIG. 2, assuming a stitch of length Z as indicated in FIGS. 3 and 4 to correspond with the 1,000 synchronizer pulses, the computer 26 is programmed to allot selected portions of each thousand pulses to the different feeding phases, namely and in order, dwell, acceleration, running speed, deceleration and dwell. Thus, for instance, control logic may count a first and a last 200 synchronizer pulses of a stitch length Z as indicated in FIG. 2, allowing two-fifths or 40 percent dwell time in a cycle for the needle 16, and between needle engagements count or allocate 600 pulses (60 percent) for work acceleration, full speed running, and deceleration, to the end that versatility and optimum performance may be attained and minimum deviation forces created in the system to be explained. As schematically shown, for instance, the computer may divide, i.e., generate the intermediate 600 pulses, as relates to Y or angular change motion, into a group A of 9 pulses for acceleration, another group B of 18 pulses for running, followed by a group C of 9 for deceleration. The drive circuit 31 for the Y-motor 32 is sent the acceleration pulse A after the initial, say 200, dwell pulses (0 in FIG. 3) have been counted, is sent the running pulse (B in FIG. 3) after 9 computer pulses are counted, is sent the decelerating pulse (C in FIG. 3) after 18 more computer pulses etc. In like manner the computer 26 acting on the programmed tape information selecting a table of numbers corresponding to the mentioned 0, 9, 18, 9, 0 table, sends similar pulsing to the drive circuit for the motor 30. Hence, as shown in FIG. 4 in feeding the work from a stitch point S (FIGS. 1, 2 and 4) an incremental ramp length Z to any point C, the motors 30, 32 are caused to concurrently and proportionately, that is throughout the Z step, transmit their respective components of motion, the components varying as required properly to locate C a Z distance from S. Velocity of the work, i.e., stitch speed and direction, is thus determined precisely between consecutive needle insertions.

Figure 14:
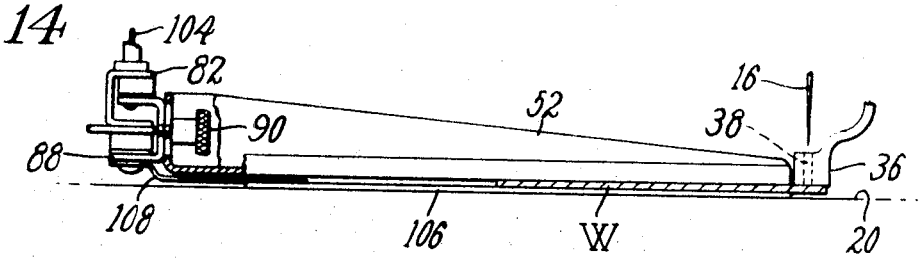

Advantageously, a presser foot 36 (FIGS. 6, 14) is adjustably mounted heightwise of the table 20 and is formed with an opening 38 coaxially surrounding the needle 16. This presser foot acts as a holddown regardless of the direction of work feed, the presser foot shank being formed and disposed so as to allow a work clamp 52 to closely approach the needle 16 from any side. As indicated in FIG. 14 the foot 36 is preferably spaced slightly above the table 20.

Referring now mainly to FIGS. 5–12 the automatic guidance mechanism highly responsive to control data transmitted as just described will be explained. A work moving means comprises a pair of cooperative, non-rectangular coordinate arms, namely an X-arm 40 on which the X-motor 30 is secured, and a Y-arm 42 on which the Y-motor 32 is secured. The X-arm 40 is pivotally secured to the table 20 by a pin 44 (FIGS. 1, 5) and the Y-arm 42 is pivotally secured to the table by a pin 46. An output pinion 48 (FIG. 7) of the Y-motor 32 is accordingly effective to swing the X-arm 40 about the pin 44 in either direction, through connections about to be described, and an output pinion 50 (FIGS. 7 and 9) of the X motor 30 is operative to move a work support, preferably in the form of the clamp 52 (or 52 and a cooperative low friction plate 106 later mentioned) radially relative to the axis of the X arm pivot pin 44.

It is preferred to consider each feed increment Z as having X and Y components though it will be recognized they are not strictly orthogonal. This is due to the fact that the step of the motor 30 actually imparts a small change in radius relative to the pivot 44 while the step of the motor 32 imparts a small change in angle, i.e., an arcuate path about the axis of that pivot; the resultant Z step is the combination of two coordinate movements respectively small compared to the effective lengths of the arms 40, 42, or the distance of the needle 16 from their pivots 44, 46, respectively. Deviation from orthogonal relation is accordingly insignificant in the illustrative system embodying freedom in two degrees of movement.

For swinging the X-arm 40 the pinion 48 meshes with a rack 54 (FIGS. 7, 10 and 11) slidable lengthwise on spaced rollers 56 (FIG. 7) and 58 (FIGS. 8, 10 and 11) in guideways formed in the Y-arm 42, a front end of the rack being secured by means of an L-shaped bearing bracket 60 and telescoping swivel pin 62 to the free end portion of the X-arm 40. The pin 62 extends vertically in a bearing portion 64 integral with the X-arm 40 and is coupled to the bracket 60 by a lock pin 66 (FIGS. 8 and 10).

For controlling radial movement of the work support or clamp 52 relative to the X-arm pivot 44, the pinion 50 meshes with a rack 70 (FIGS. 7 and 9) slidable in longitudinal guideways 72, 74 secured to the X-arm 40. Secured to an end of the rack 70 for horizontal movement therewith is a work clamp carrier 76 (FIGS. 8 and 11) and connections next to be described. The carrier 76 is longitudinally guided by two spaced rollers 78 journaled therein and rotatably engageable with inner walls of a guideway 80 connected to the underside of the X-arm 40. The carrier is secured to an upper U-shaped support 82 extending parallel to the X-arm. Pairs of parallel leaf springs 84, 84 and 86, 86 (FIG. 10) having their respective upper ends riveted to the support 82 have their lower ends riveted to a U-shaped interengaging member 88 which is thus yieldingly suspended over the table 20 between heightwise limits determined by the lower or straddled leg of the support 82. The work clamp 52 is detachably secured to the member 88 by spaced thumb screws 90, 90 (FIGS. 8, 11 and 14) respectively threaded in holes 92, 92 shown in FIG. 10. The clamp 52 will normally have a bottom contour approximating the shape of an article to be guided thereby and be of light weight. As indicated herein the top clamp 52 has a cut-out friction pad 94 (FIG. 8) preferably of a shape and material to marginally engage with friction the upper surface of the work 14, the pad being secured as by adhesive to the underside of the clamp 52.

As herein illustrated (see FIG. 11) an intermediate roller 96 in the guideway 80 is mounted to serve as a take-up for any front-rear play of the carrier 76 relative to the X-arm 40. For this purpose the roller 96 is journaled in one end of a lever 98 pivoted by a pin 100 (FIGS. 7 and 11) to the carrier 76. Between the pin 100 and the roller 96 a rubber grommet 102 yieldable slightly in transverse shear, as shown in FIG. 12 and interconnecting the lever 98 and the carrier 76 is effective to bias the roller 96 in its guideway. Other alternative structure may of course be employed for this function if desired.

The clamp 52 and its pad 94 are automatically movable heightwise from operative guidance relation with a work piece 14 on the table 20 by means such as a solenoid (not shown) controlled from the perforated program tape 28, the solenoid acting through a Bowden wire 104 (FIGS. 8, 10, 13, 14) to elevate the member 88 and hence the pad 94 by deflecting the springs 84, 84 and 86, 86 to the extent allowed by the support 82. Their descent into work engaging relation is by the influence of gravity plus force of the springs 84, 86.

Figure 13:
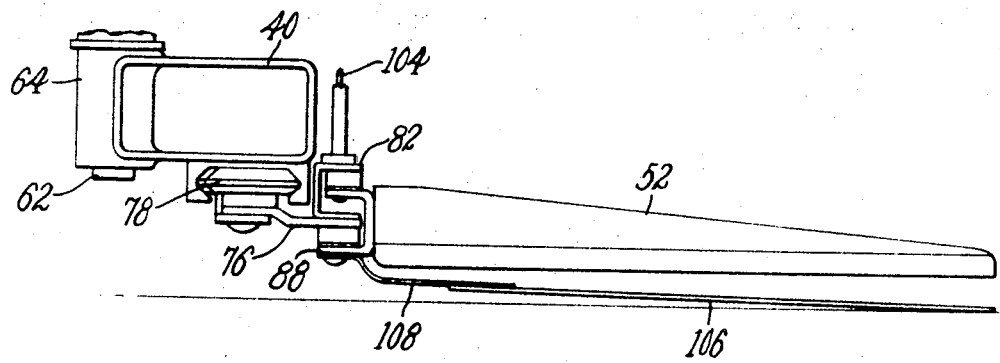
FIGS. 13 and 14 correspond largely to FIG. 8 and show an alternate work clamp structure in its inoperative and operative positions, respectively.

For guidance of certain work pieces W it may be desirable to employ a lower, thin work clamp 106 (FIGS. 13, 14) having a low friction under surface. It is adapted slidably to engage the table 20 during operation and while holding the work flatly clamped against the underside of the clamp 52 or its pad 94. The clamp 106 is supported on parallel leaf springs 108 (one shown) secured to the member 88. Conveniently, when the clamp 52 is lifted as shown in FIG. 13, the work W may be placed between the clamps 106 and 52. Desirably the contour of the low friction clamp 106 may correspond in part to portions of the perimeter of the clamp 52 to be adjacent to the needle 16.

From the foregoing it will be understood that the guidance structure is relatively simple in form and low in mass. The stepping motors 30, 32, though not restricted in type, may for instance advantageously be of the electromagnetic harmonic drive type disclosed in United States Letters Patent 3,331,974, issued July 18, 1967, in the name of Herbert Proctor, these motors exhibiting both a capability for precision operation at high pulse rates and a position holding ability between steps, i.e., in this case at the times of dwell in which the needle 16 penetrates the fabric 14. Accurate directional control of the clamp 52, or a work support of another design if preferred, by means of input pulses to the motors 30, 32 as above described insures that the work will be positively fed in predetermined direction in most advantageous manner in the available intervals between the dwells required for stitch forming, with optimum acceleration, running rate and deceleration for the particular work. If intermittent guidance is not required as when, for instance, continuous adhesive seaming is practiced, appropriate guidance pulsing would enable the motors 30, 32 to effect continuous guidance of the clamp 52 and a work piece.

While the illustrative apparatus is herein described as adapted for use in guiding a work piece having freedom in two degrees of motion it is to be understood that in various aspects the invention is also applicable to systems wherein the work is restricted to freedom of motion in one degree or where the work has freedom in three degrees. Moreover, the usage of two guidance units each similar to the apparatus above described and arranged adjacent one another for operation from common electronic controls, and respectively loaded from a common station, provides high speed production and efficiency at low cost per unit.

In operating the apparatus a work piece 14 may first be manually or otherwise located on the table 20 or the lower clamp 106 if used. Presence of the work thus located may trigger a sensor (not shown) for initiating a series of operations including for instance: lowering the work clamp 52 onto the work 14 or W; starting the machine 12; steering the work on the table 20 relative to the needle 16 with the desired directional increments and speed changes according to the predetermined numerical control data; and stopping the machine 12 at any desired point with needle up to free the work for removal. It will be understood that the work may optionally be advanced for peripheral or other operations in one direction, for instance from C1 as a fixed starting point on each collar 14 (FIG. 5) to its point C3, or on alternate collars the work path may proceed instead from C3 reversely to C1, depending on the control data. Programming guidance for alternatively clockwise and counterclockwise operations, for instance, eliminates so-called "dead time" and can thereby keep the stitcher 12 functioning nearly 100 percent of the time in an automatic system. Also, if deemed desirable to modify stitch length from constant increments, as for example in negotiating sharp curvature, this too may be done. Versatility of the apparatus and its relatively non-complex electronic controls for securing exact positions provide assurance of productivity gains in many different fields.

The system has been described as applicable to non-rectilinear coordinate arrangement; the arcuate motion of the X-arm 40 is found to introduce no significant error change over a true X-Y system, affords low inertia, and is compensated for in the control logic.

Having thus described our invention, what we claim as new and desire to secure by Letters Patent of the United States is:

1. In an automatic work guidance mechanism for a sewing machine having a rotary crankshaft and a needle cyclically operated thereby, the mechanism having a member engaging the work for movement parallel and normal to its own plane relative to the needle, a pulse generating synchronizer energized by the crankshaft, and means responsive to the synchronizer pulses for providing stepping motor driving pulses, means mounting the member for movement in substantially incremental X and Y directions parallel to the work plane comprising:
   a coordinate arm only pivotable about an axis normal to the work plane;
   a first stepping motor operatively connected to the pivotable arm by a rack and pinion for swinging the arm;
   a second stepping motor operatively connected to the arm by a rack and pinion and to the member for radially shifting the member relative to the pivotal axis of the swinging arm; and
   means interconnecting the stepping motors and the driving pulse means for driving the motors.

2. A mechanism as in claim 19 additionally comprising a second arm supporting the first stepping motor for swinging the pivotable arm.

* * * * *